US006367863B1

(12) United States Patent
Cho

(10) Patent No.: US 6,367,863 B1
(45) Date of Patent: Apr. 9, 2002

(54) REINFORCEMENT FOR DOOR HINGE OF AUTOMOBILE

(75) Inventor: Kyoung-Ho Cho, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/692,799

(22) Filed: Oct. 20, 2000

(30) Foreign Application Priority Data

Dec. 29, 1999 (KR) .......................................... 99-64680

(51) Int. Cl.[7] .................................................. B60J 5/04
(52) U.S. Cl. .................................... 296/146.11; 49/502
(58) Field of Search ......................... 296/146.11, 146.6; 49/502

(56) References Cited

U.S. PATENT DOCUMENTS 5,876,086 A * 3/1999 Lagrou et al. ......... 296/146.11
6,129,410 A * 10/2000 Kosaraju et al. ............ 296/188
6,205,714 B1 * 3/2001 Staser et al. .................. 49/502
6,241,307 B1 * 6/2001 Kim ........................ 296/146.8

FOREIGN PATENT DOCUMENTS

JP 4-356220 A * 12/1992 ............ 296/146.11

* cited by examiner

*Primary Examiner*—Joseph D. Pape
*Assistant Examiner*—Patricia Engle
(74) *Attorney, Agent, or Firm*—Christie, Parker & Hale, LLP

(57) ABSTRACT

The invention relates to a reinforcing member for a door hinge installed at the body of the automobile to improve strength of supporting the door hinge that rotates a door open or close not only by forming a box shape to improve strength to the gravitational direction, but also by eliminating a limitation in length of a reinforcing flange, the reinforcing member comprising: a flat plate formed with a bent portion at a predetermined portion thereof to be tightly attached to the internal side of an inner panel of a door for fixation; two pieces of first wing portions faced each other and extended at both edges of the flat plate in the vertical direction thereto; and a second wing portion extended at both edges of the flat plate to be in perpendicular to the first wing portions for fixation.

2 Claims, 3 Drawing Sheets

REINFORCEMENT FOR DOOR HINGE OF AUTOMOBILE

BACKGROUND OF THE INVENTION

1. Field of the Invention

The present invention relates to a reinforcing member for a door hinge of an automobile to improve strength of a door hinge installed at a body of an automobile when a door is opened or closed by rotary movements of the door hinge.

2. Description of the Prior Art

In general, an automobile has a plurality of doors to be opened or closed to enable passengers to get in or out. As shown in FIG. 3, the doors D are arranged at a lateral side of the body B with each side being coupled with a door hinge 50 and have a door latch assembly 51 to keep the locked state of the door D.

As shown in FIG. 4, the door hinge 50 comprises a first hinge 53 fixed at a lateral side of the door D with a bolt 52, a second hinge 55 fixed at a body (filler) (B) and coupled with the first hinge 53 and a rotary axis 54, and a reinforcing member 56 inserted between the first hinge 53 and bolt 52.

At this time, the reinforcing member 56 is made in a shape of a plate, being tightly fixed at the side of the first hinge 53 and has a reinforcing flange 57 formed upright at a side thereof.

In other words, if weight is applied to the gravitational direction in FIG. 3, the first hinge 53 drops low. Thus it is necessary to include a reinforcing member 56 to improve strength of the first hinge 53.

Particularly, the reinforcing flange 57 is made in a maximum length to increase the strength of the reinforcing member 56 to the maximum.

However, there is a limitation in manufacturing the reinforcing flange by bending to a length adequate to improve strength of the aforementioned reinforcing member. Also, if the reinforcing flange is formed only at one side of the reinforcing member as described above, it may not be possible to form a box shape of a reinforcing space, thereby lowering down the efficiency of the reinforcing member to improve strength of a door hinge.

In other words, the aforementioned reinforcing member is manufactured by bending in a mold like a drawing, so that there is a limitation in the length of a reinforcing flange to be manufactured in the mold. As a result, besides the limitation in improving strength of a door hinge, if the reinforcing member is manufactured by drawing in a mold, it becomes difficult to form a box shape of a reinforcing space, thereby forming a reinforcing flange only at one side of a door.

SUMMARY OF THE INVENTION

The present invention is disclosed to solve the aforementioned problems and it is an object of the present invention to provide a reinforcing member of a door hinge of an automobile constructed not only for forming a box shape of a reinforcing space to improve strength to the gravitational direction, but also for eliminating a limitation in manufacturing a reinforcing flange in a predetermined length.

In order to accomplish the aforementioned objects of the present invention, there is provided a reinforcing member of a door hinge of an automobile; a flat plate is formed with a substantially perpendicular bent portion at a predetermined location thereof to be securely attached to the internal side of an inner panel of a door. The flat plate has a top edge, a bottom edge and a plurality of side edges. Two pieces of first wing portions face each other and extend at the side edges of the flat plate perpendicular thereto, wherein said first wing portions further extending from the top edge of the flat plate to the bottom edge of the flat plate, the first wing portions are further detached from the flat plate at the bent portion of the flat plate by a cut portion, a second wing portion extends at the top edge of the flat plate perpendicular thereto and is adapted to be coupled to the first wing portions in a perpendicular orientation.

DESCRIPTION OF THE DRAWING PORTIONS

For fuller understanding of the nature and object of the invention, reference should be made to the following portion detailed description taken in conjunction with the accompanying drawing portions in which.

DETAILED DESCRIPTION OF THE INVENTION

Objects and aspects of the invention will become apparent from the following portion detailed description of preferred embodiments with reference to the accompanying drawing portions.

Figure 1:
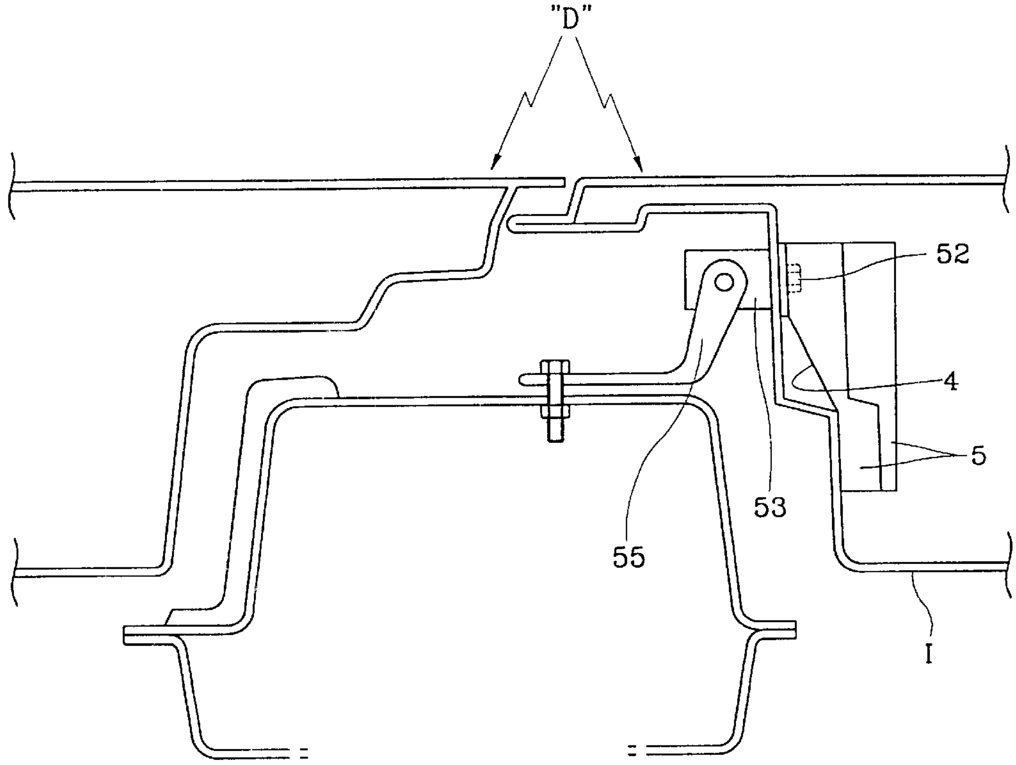
FIG. 1 is a crosssectional view for illustrating installation of a reinforcing member for a door hinge of an automobile.
Figure 2:
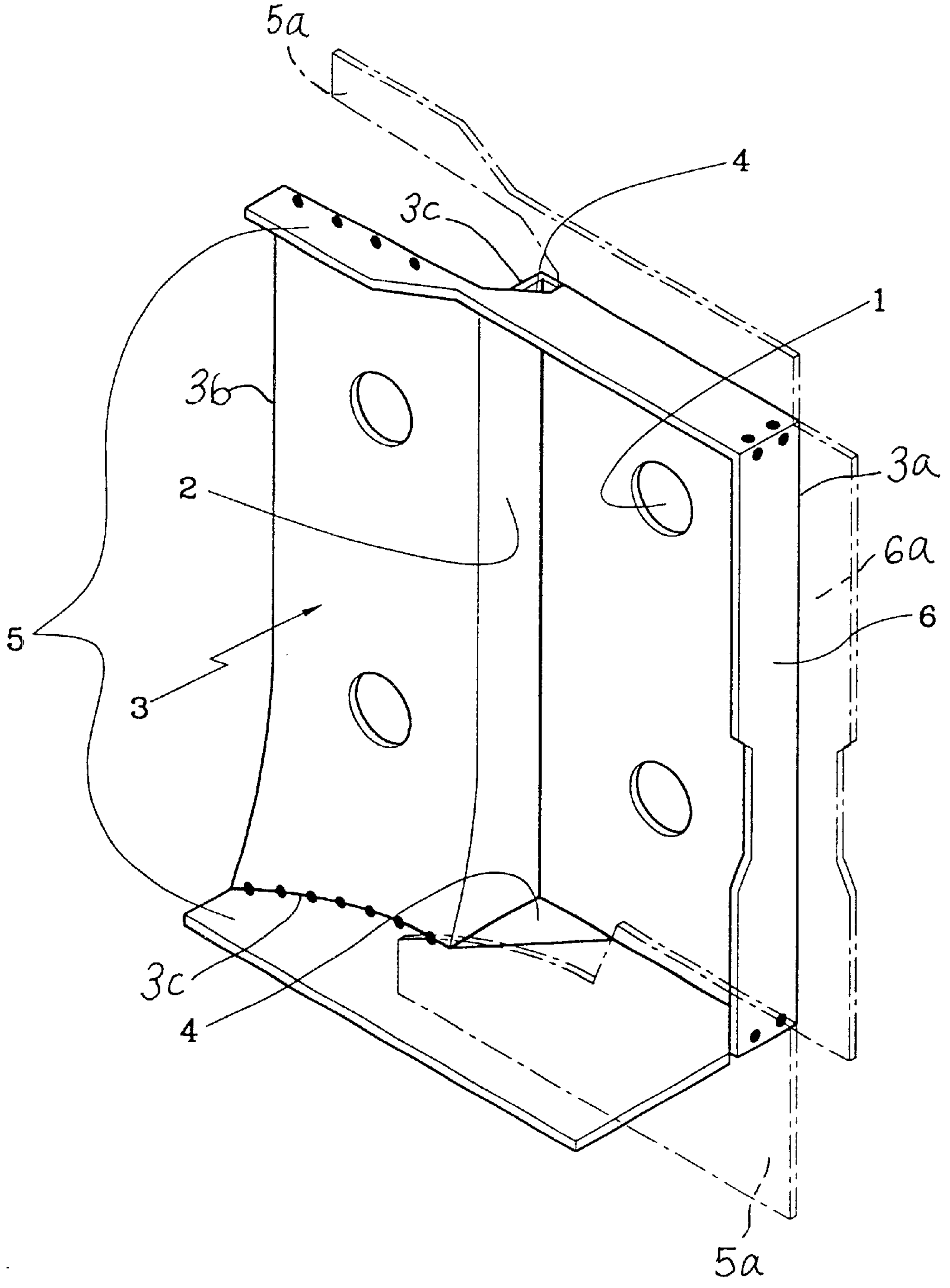
FIG. 2 is a perspective view for illustrating the reinforcing member shown in FIG. 1.
Figure 3:
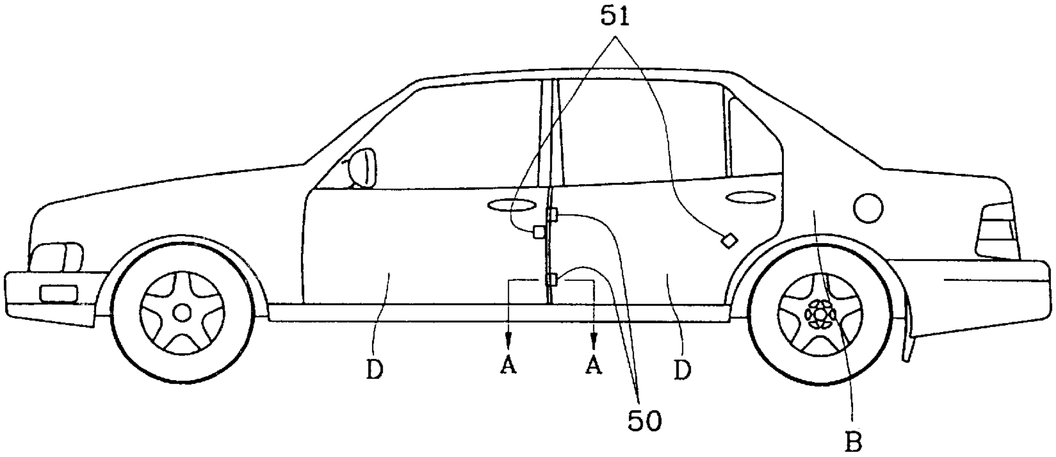
FIG.3 (prior art)
FIG. 3 is a schematic lateral view for illustrating installation of a door hinge of a general automobile.
Figure 4:
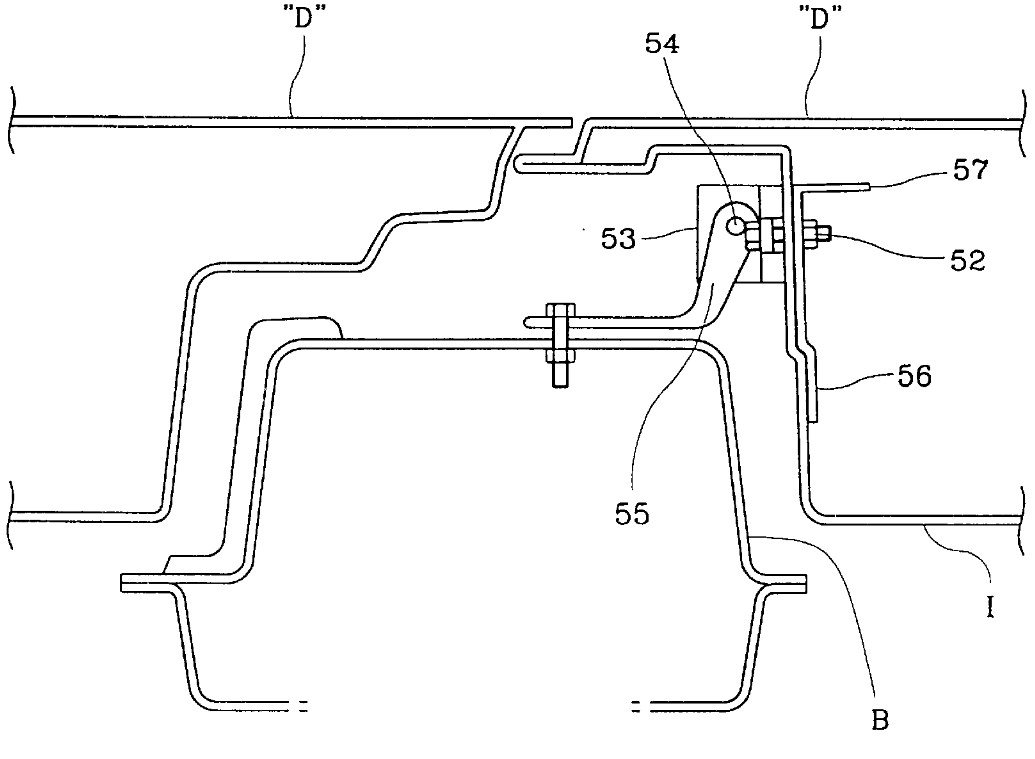
FIG.4 (prior art)
FIG. 4 is a cross-sectional view for illustrating a part cut along line A—A shown in FIG. 3.

FIG. 1 is a cross-sectional view for illustrating installation of a reinforcing member for a door hinge of an automobile, and FIG. 2 is a perspective view for illustrating the reinforcing member shown in FIG. 1. The reinforcing member of a door hinge includes a flat plate 3 having a plurality of bolt holes 1 and a bent portion 2 formed to be suitable for an inner panel I of a door D, two pieces of a first wing portions 5 faced each other, extended at a part of the flat plate 3 and divided at the bent part 2 by a cut part 4 also referred to as a cut portion 4. Flat plate 3 (shown in FIG. 2) also has a bottom edge 3*a,* a top edge 3*b* and a plurality of side edges 3*c.* A second wing portion 6 is extended from the top edge 3*b* of the flat plate 3 in perpendicular orientation to the first wing portions.

If the first and second wing portions 5, 6 are bent perpendicularly to the flat plate 3, a reinforcing member can be formed with a box shape by using the flat plate 3 and the first and second wing portions 5, 6.

Also, the cut part 4 is made because the bent part 2 is formed at the flat plate 3. If the first wing portion 5 is extended to the entire length of the flat plate 3, it becomes impossible to bend the first wing portion 5.

After bending of the first and second wing portions 5, 6, a part contacted with the flat plate 3 is coupled by welding to significantly improve strength.

Now, functional effects of the reinforcing member thus constructed will be described below. The reinforcing member is manufactured in a shape of a flat plate through a drawing process, and the first and second 5, 6 are then bent. Second wing portions prior to bending are designated as reference numerals 5*a* and 6*a* respectively.

After bending of the first and second wing portions 5, 6, a part, where the first and second wing portions 5, 6 and the flat plate 3 are contacted together, are welded for fixation.

After completion of manufacturing the reinforcing member by the welding process, a worker positions the reinforcing member at an inner side of an inner panel I of a door D and exactly matches the bolt holes 1 together with those of the inner panel I.

If the bolt holes 1 of the reinforcing member are put together with those of the inner panel I, a bolt 52 is inserted into the bolt holes 1 for firmly securing the first hinge 53 to the external side of the inner panel I.

The first hinge 53 is attached to the external side of the inner panel I and fixed with the bolt 52. After fixation of the first hinge 53 with the bolt 52, the reinforcing member is formed with a box shape.

As described above, if weight is applied to the door hinge secured with the reinforcing member, a momentum will be formed on the reinforcing member. As a result, the first and second wing portions help resist the momentum to thereby improve strength of the door hinge.

In other words, if the momentum is applied to the second wing portion 6, the momentum (weight) is to be distributed or absorbed to the whole reinforcing member because the second wing portion 6, the first wine portion 5 and the flat plate 3 are welded for connection.

At this time, after the drawing process to manufacture a flat plate of the reinforcing member, the first and second wing portions 5, 6 are bent and set straight by a worker to properly determine the height thereof. Therefore, the height of the first and second wing portions 5, 6 is no longer to be determined by a mold that has been used at the drawing process in the prior art.

As a result, it is possible to set up the first and second wing portions 5, 6 in height adequate to the weight or momentum that will be applied to the door hinge, so as to improve the strength of supporting the weight of the door hinge.

As described above, there is an advantage in the reinforcing member of a door hinge of an automobile in the present invention in that the flat plate is formed in a shape of a flat surface with a bent part, the first and second wing portions are formed to be bent in a predetermined length at edges of the reinforcing member, and a box shape of a reinforcing space is formed by bending and welding the first and second wing portions, thereby improving strength of supporting the weight of the door hinge.

Besides, since the flat plate manufactured by the drawing process is bent to form the first and second wing portions, there may be no limitation in the height of the first and second wing portions of the reinforcing member.

What is claimed is:

1. A reinforcing member for a door hinge an automobile comprising:

a flat plate formed with a substantially perpendicular bent portion at a predetermined location thereof to be securely attached to the internal side of an inner panel of a door, said flat plate having a top edge, a bottom edge and a plurality of side edges;

two pieces of first wing portions facing each other and extending at the side edges of the flat plate perpendicular thereto, wherein said first wing portions further extending from the top edge of the flat plate to the bottom edge of the flat plate, said first wing portions further detached from the flat plate at the bent portion of the flat plate by a cut portion; and a second wing portion extending at the top edge of the flat plate perpendicular thereto and adapted to be coupled to the first wing portions in a perpendicular orientation.

2. The member, as defined in claim 1, wherein the flat plate is formed with a plurality of bolt holes for enabling the flat plate to be coupled to an inner panel of the door.

* * * * *